US007536169B2

(12) United States Patent
Duvall

(10) Patent No.: US 7,536,169 B2
(45) Date of Patent: May 19, 2009

(54) METHOD OF AND APPARATUS FOR UTILIZING GEOGRAPHICALLY SPREAD CELLULAR RADIO NETWORKS TO SUPPLEMENT MORE GEOGRAPHICALLY LIMITED STOLEN VEHICLE RECOVERY RADIO NETWORKS IN ACTIVATION OF RADIO TRACKING AND RECOVERY OF SUCH VEHICLES

(75) Inventor: William Duvall, Sudbury, MA (US)

(73) Assignee: Lojack Operating Company LP, Westwood, MA (US)

( * ) Notice: Subject to any disclaimer, the term of this patent is extended or adjusted under 35 U.S.C. 154(b) by 269 days.

(21) Appl. No.: 10/150,818

(22) Filed: May 17, 2002

(65) Prior Publication Data
US 2004/0198309 A1    Oct. 7, 2004

(51) Int. Cl.
H04M 11/04    (2006.01)
(52) U.S. Cl. ............... 455/404.1; 455/404.2; 340/436; 342/457; 342/44; 342/465; 701/214; 701/301
(58) Field of Classification Search ............... 455/404, 455/404.1, 404.2; 342/457, 465, 44; 701/214, 701/301; 340/5.81, 539.18, 426.19, 539.13, 340/425.5, 988, 436; 382/115
See application file for complete search history.

(56) References Cited

U.S. PATENT DOCUMENTS

| 4,818,998 | A |   | 4/1989  | Apsell et al. ............... 342/44    |
|-----------|---|---|---------|-----------------------------------------|
| 4,908,629 | A |   | 3/1990  | Apsell et al. ............... 342/457   |
| 5,003,317 | A | * | 3/1991  | Gray et al. .................. 342/457  |
| 5,155,689 | A | * | 10/1992 | Wortham ................. 455/456.3     |
| 5,515,285 | A | * | 5/1996  | Garrett et al. ............... 701/300  |
| 5,555,286 | A | * | 9/1996  | Tendler .................... 455/404.2  |
| 5,838,237 | A | * | 11/1998 | Revell et al. ............. 340/573.1   |
| 5,895,436 | A | * | 4/1999  | Savoie et al. ............... 701/214   |
| 5,917,423 | A |   | 6/1999  | Duvall ................... 340/825.37   |
| 6,370,475 | B1| * | 4/2002  | Breed et al. ................. 701/301  |

FOREIGN PATENT DOCUMENTS

| TW | 413366          | 11/2000 |
|----|-----------------|---------|
| WO | WO 97/45962     | 12/1997 |
| WO | WO01/32480 A1   | 5/2001  |

* cited by examiner

Primary Examiner—Erika A Gary
Assistant Examiner—Pierre-Louis Desir
(74) Attorney, Agent, or Firm—Iandiorio Teska & Coleman

(57) ABSTRACT

Extending the activation and tracking capability of stolen vehicle recovery dedicated radio-frequency networks by the supplementary use of widely geographically provided cellular telephone-frequency band networks.

24 Claims, 2 Drawing Sheets

Figure 1:
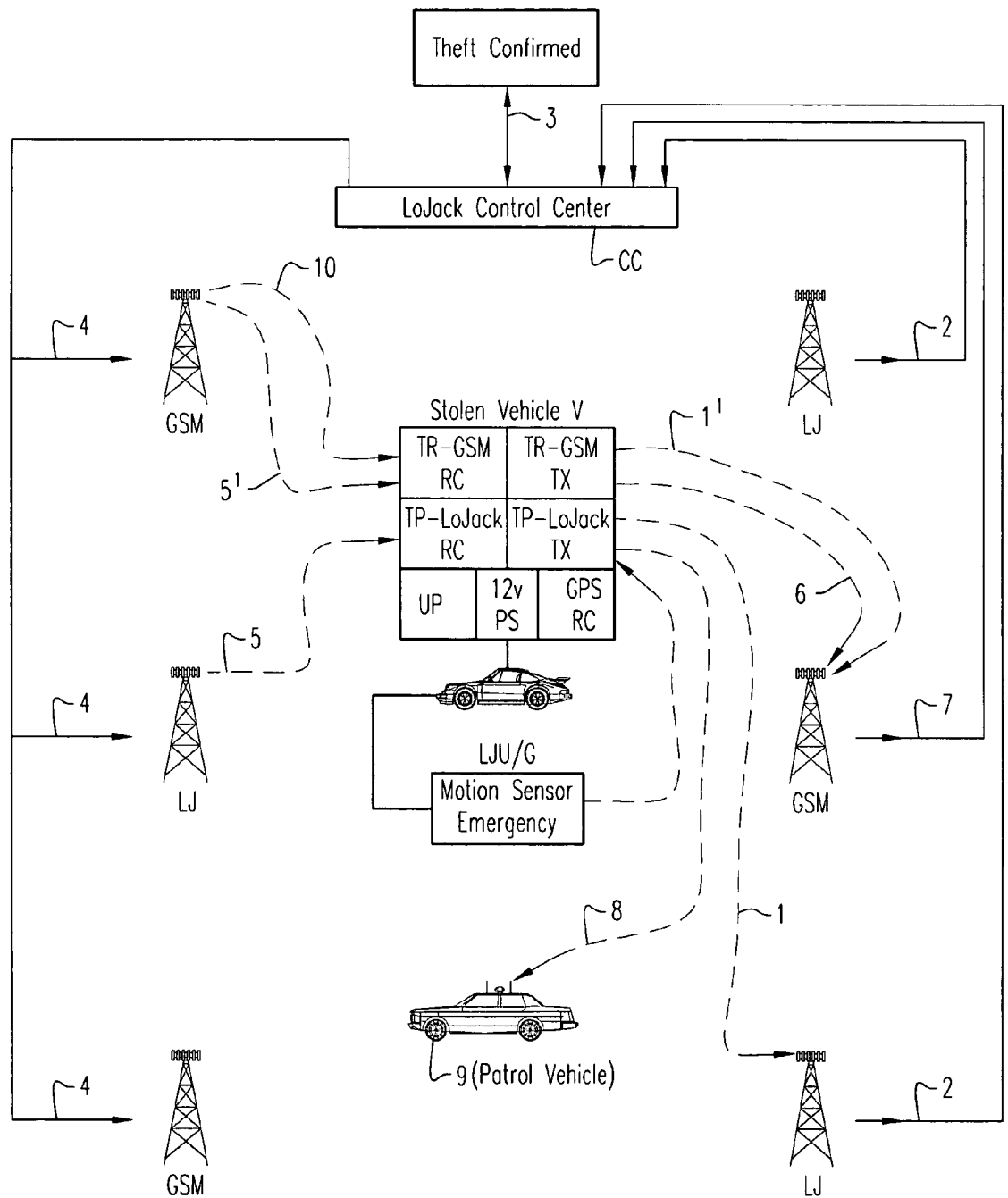

METHOD OF AND APPARATUS FOR UTILIZING GEOGRAPHICALLY SPREAD CELLULAR RADIO NETWORKS TO SUPPLEMENT MORE GEOGRAPHICALLY LIMITED STOLEN VEHICLE RECOVERY RADIO NETWORKS IN ACTIVATION OF RADIO TRACKING AND RECOVERY OF SUCH VEHICLES

FIELD OF INVENTION

The invention relates generally to the radio tracking of stolen vehicles and the like, being more particularly concerned with accelerating the time required to alert the vehicle owner or others of unauthorized movement or theft, in order to enable the initiation of the police or other vehicle tracking and recovery operations as described, for example, in U.S. Pat. Nos. 4,818,998 and 4,908,629, and as provided by the LoJack® system of the assignee of the present invention, and as also described in, for example, the assignee's 1989 brochure entitled "LoJack Stolen Vehicle Police Recovery Network."

BACKGROUND

As described in said patents and publication, upon receiving notice of the unauthorized movement of an owner's vehicle equipped with such a "LoJack" or similar system, the owner so notifies the police or other recovery authority to put in operation dedicated radio network transmitters for querying vehicle-installed transponders that then become activated to transmit radio-tracking signals to police or other recovery vehicles for tracking the stolen vehicle and recovering of the same.

Systems for automatically sensing the unauthorized tampering, use, or more generally the movement of the vehicle include, for example, those described in U.S. Pat. No. 5,917,423 of said assignee. Systems For Aiding The Alerting Of The Owner Of The Vehicle Of Its Theft—so-called "uplink" notification—are also described in said assignee's PCT application PCT/GB 97/01444 published on or about May 25, 2000.

While the above-referenced radio tracking techniques are widely and highly successfully in use, permitting recoveries by the police in up to about a few hours or so on the average, it is the delay in notifying the owner of the vehicle theft, so as to put the recovery technique in motion, that is the weak link in the recovery process. There is, moreover, an economic limit on the feasible number and locations of dedicated vehicle recovery radio networks (generally of VHF frequencies), and thus a relatively limited geographic area for alerting and recovery. The present invention, however, uses existing widely geographically spread cellular telephone radio networks (UHF frequencies) as supplement to the limited radio recovery networks to enlarge the effected area of recovery activation, both in terms of notification of vehicle theft and in providing rough or coarse location of the zone in which the stolen vehicle is present, and then the facility to bring the tracking vehicle into that zone for fine tracking by the "LoJack" or similar recovery system.

A fundamental issue that the concept of the invention addresses is how to activate a stolen vehicle transponder when the vehicle is out of its "home" recovery network coverage area and frequency, and is, indeed, in a wide coverage area where other radio networks exist (as for other uses, such as cellular telephone) that have completely different frequencies. The invention teaches how to supplement the limited coverage area of the vehicle recovery transmitter network with the facilities of the widely geographically existing cellular radio telephone networks and in a novel manner that extends the activation and tracking capabilities of the recovery network. This is effected by equipping the vehicle not only with a VHF transponder responsive with code to the radio recovery network transmitter queries, but also a vehicle-equipped cellular telephone frequency transceiver, responsive also with identification to the cellular radio network query. The site of the cellular radio network receiving the vehicle transceiver reply thus identifies itself to the control center (coarse location) which enables the tracking vehicle to proceed into that area locally and either with the cooperation of the radio recovery network transmitter if within range, or by carrying a local radio recovery transmitter in the recovery vehicle, activating the vehicle transponder to enable tracking of the stolen vehicle locally.

OBJECTS OF INVENTION

The principal object of the present invention, thus, is to provide a method of and apparatus for the activation and tracking coverage of stolen vehicles well beyond the capability of a dedicated local radio recovery network, such as of the "LoJack" type system, by enabling the use of the supplementary assistance of the widely geographically spread cellular telephone network to provide coarse location information that may extend well outside the range of the recovery network reach.

Other and further objects will be explained hereinafter and are more particularly delineated in the appended claims.

SUMMARY

In summary, however, the invention embraces a method of utilizing the relatively wide-geographically spread cellular radio networks to supplement more limited stolen vehicle recovery radio network sites in activation of radio tracking and recovery of such a vehicle, that comprises, equipping the vehicle with both a transponder for replying with a unique reply code transmission to a query from the recovery networks and a transceiver for replying with unique identification transmission to a query from the cellular network; upon confirming vehicle theft at a control center, instructing both the recovery network and the cellular network to send their respective queries to the respective transponder and transceiver of the vehicle; receiving from the vehicle transceiver said unique identification transmission at a site of the cellular network and sending from such site an identifying number thereof to the control center for providing over the wide geography of the cellular network, rough location guidance information to a recovery vehicle; and receiving from the vehicle transponder at such recovery vehicle its reply code transmission to enable fine tracking by the recovery vehicle of the stolen vehicle.

Preferred and best mode implementations are later detailed.

DRAWINGS

Figure 2:
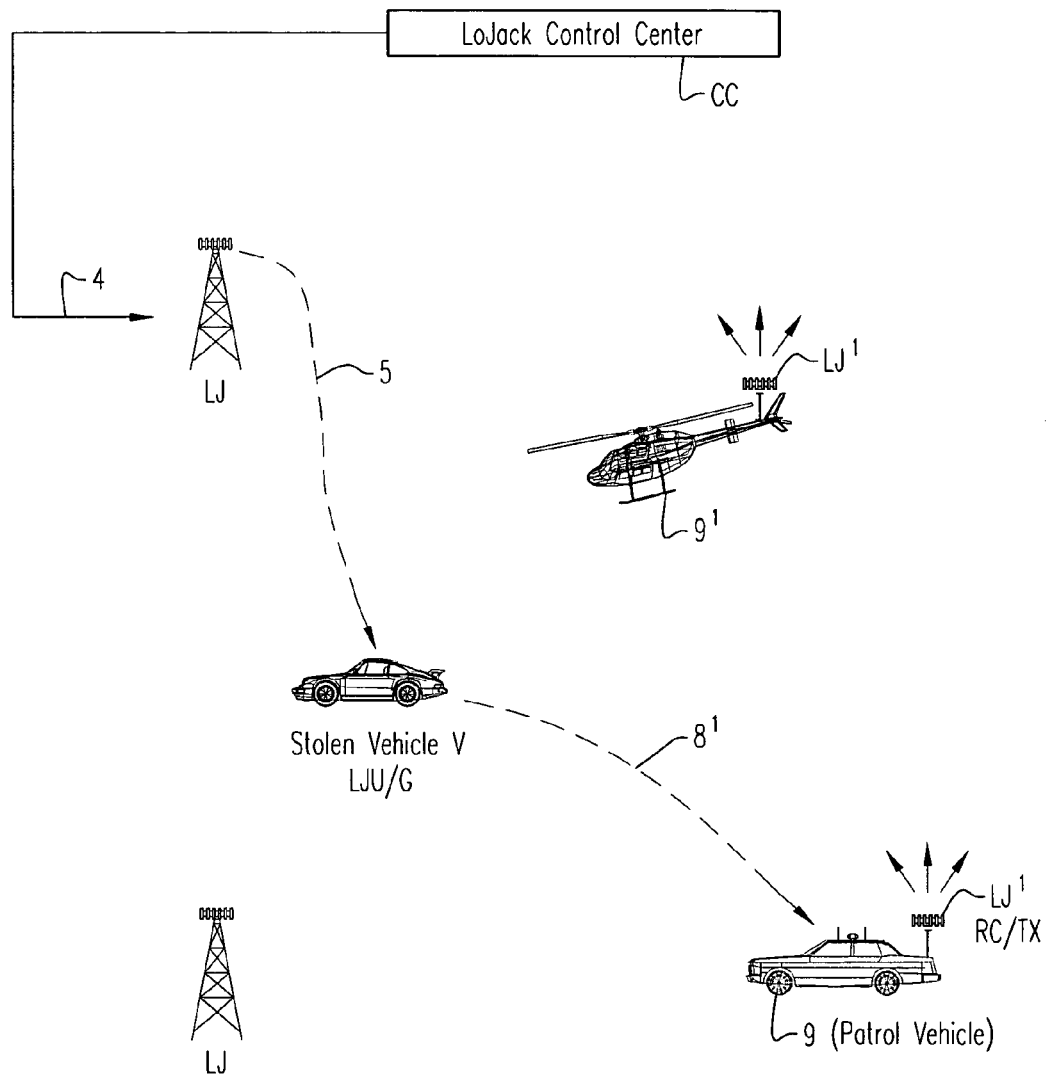

The invention will now be explained in connection with the accompanying drawings, FIG. 1 of which is a schematic diagram of the overall operating system of the invention; and FIG. 2 is a diagram of a modification.

PREFERRED EMBODIMENT(S) OF THE INVENTION

Referring to FIG. 1, a radio tracking recovery system as of the before-described preferred "LoJack" type is shown comprising a dedicated radio vehicle recovery (VHF—say, 160-174 megahertz) antenna network of three towers labeled "LJ" (two on the right and one on the left) working in cooperation with a control center CC. An uplink technique, earlier described, may sense vehicle movement and send an early warning message at "UP" from the vehicle that carries a vehicle-equipped transponder TP ("LoJack RC"-"LoJack TX").

The uplink message is shown transmitted along path 1 to the tower LJ (bottom right) so that the tower may alert the control center CC via path 2—for example, a telephone line or the like. The control center then alerts the vehicle owner or customer by way of phone page, e-mail, etc. of the possible theft, so that confirmation of the theft may be made by the owner to the control center, as indicated at 3. Alternatively, if there is no uplink provided, when the owner is otherwise apprised of the missing vehicle, the owner directly contacts the control center (police) at 3.

The control center then sends an activation command along line 4 to the tower LJ (shown as the left-hand tower) which in turn sends an interrogation signal or query at 5 to the receiver portion RC of the transponder TP provided in the vehicle V, hopefully still in the zone of the LJ antenna network. The vehicle-equipped transponder TP then starts its vehicle-identification coded radio pulse tracking signal transmissions at 8 from its transmitter TX, for enabling tracking by the recovery vehicle (police patrol) 9 with its direction-finding equipment shown as the roof antennas—all as described in said patents.

In accordance with the present invention, in order to obtain greater geographic coverage than the limited number of radio-tracking networks LJ will permit, a novel use is made of the much wider geographically spread existing cellular telephone tower networks, indicated at GSM in FIG. 1—two shown to the left, and one on the right—and all operated at a very different higher UHF frequency band. To use this supplemental GSM network for the purposes of the invention, the vehicle V is also equipped with a cellular telephone transceiver TR comprising a receiver "GSM RC" and a transmitter "GSM TX" on cellular radio frequencies.

In addition to sending the uplink early warning at 1 to the radio vehicle-recovery network towers LJ, the uplink message is also sent at $1^1$ to be received over a much wider geographical area by the copious cellular telephone network towers, as at the right-hand tower GSM in FIG. 1, which may also alert the control center.

Supplemental to the before-described control center instruction to the LJ network to query the stolen vehicle transponder TP via its VHF frequency, the control center also instructs the cellular telephone tower network at 4 to query the vehicle via its UHF frequency cellular telephone GSM network.

The control center thus instructs the cellular network to query the vehicle via the cellular telephone GSM network at the same time it instructs the LJ network to query the vehicle tracking transponder TP. The GSM network therefore calls (along path $5^1$) the vehicle cellular telephone receiver GSM RC, while the LJ network queries the vehicle transponder TP. The vehicle GSM TX cellular network transmitter responds along 6, sending its unique identification (ID) transmission via the cellular GSM network. The cellular tower of the GSM network that receives the transmission 6, responds to the control center CC by giving the control center (along 7) a unique identification number of its cell site, thereby identifying the actual transmitting cellular telephone site which received the unique ID transmission, and thus the coarse location region of the vehicle V. This may be near the LJ network or just out of range or geographically quite distant therefrom. At the same time, the tracking transponder TP simultaneously begins transmitting its unique reply tracking code over the LJ VHF network. The control center may, helpfully, provide the tracking vehicle 9 with the coarse or rough location of that identified cellular GSM tower to re-position and then to track on the vehicle transponder for fine position location.

Once the control center knows the coarse or rough location or area of the stolen vehicle, the security vehicle equipped with a tracker can be directed to the area where the stolen vehicle resides. It will then receive the transponder tracking signal from the stolen vehicle and can lock on and track and recover the stolen vehicle. Once the vehicle is recovered, a de-activation signal may be sent via the GSM network at 10, to reset the whole sequence.

The use of the more copious and wider-spread geographically distributed cellular GSM networks to supplement activation on vehicle theft and recovery operations—providing coarse location for ultimate fine U recovery network homing-in—may also extend far beyond any LJ recovery network range of coverage. Since, in such event, the control center can still identify a specific GSM cellular tower that receives vehicle signals via the supplemental GSM TX of the transceiver TR, it provides a tracking vehicle with a rough or coarse vehicle location or area region. The tracking vehicle—ground-based, such as a police patrol vehicle 9, FIG. 2, or an aircraft, such as a helicopter $9^1$—may thus be informed by the control center of that coarse location region identified by the cellular GSM network so that the recovery vehicle may proceed to that region. By equipping the recovery vehicle 9 or $9^1$ itself with a portable LJ transmitter tower $LJ^1$ of its own, FIG. 2, fine tracking may be achieved outside the fixed LJ networks—a result that is no longer limited by the few LJ recovery network locations.

Further modifications will occur to those skilled in this art and such are considered to fall within the spirit and scope of the invention as defined in the appended claims.

What is claimed is:

1. A method of utilizing the relatively wide-geographically spread cellular radio networks to supplement more limited stolen vehicle recovery radio network sites in activation of radio tracking and recovery of a stolen vehicle, that comprises, equipping the vehicle with both a transponder for replying with a unique reply code transmission to a query from a recovery network and a transceiver for replying with a unique identification transmission to a query from a cellular network; upon confirming vehicle theft at a control center, instructing both the recovery network and the cellular network to send their respective queries to the respective transponder and transceiver of the vehicle; receiving from the vehicle transceiver, said unique identification transmission at a site of the cellular network and sending from such site an identifying number thereof to the control center for providing over the wide geography of the cellular network, rough location guidance information to a recovery vehicle; and receiving from the vehicle transponder at a recovery vehicle its reply code transmission to enable fine tracking of the stolen vehicle by the recovery network and the recovery vehicle.

2. The method of claim 1 wherein the recovery radio network and vehicle transponder operate on a dedicated frequency, and the cellular network and vehicle transceiver operate in a predetermined band of assigned cellular telephone frequencies.

3. The method of claim 2 wherein said dedicated frequency is a VHF frequency and the cellular telephone frequencies are in the UHF band.

4. The method of claim 3 wherein the recovery radio network is of the LOJACK type and the cellular radio network is of the GSM type.

5. The method of claim 1 wherein an early warning theft uplink message is sent via either or both of the recovery radio network and the cellular network to the control center.

6. The method of claim 5 wherein vehicle movement sensing triggers such an uplink message.

7. The method of claim 5 wherein the vehicle is further equipped with a GPS receiver and the received latitude-longitude coordinates of the vehicle is also sent to the control center.

8. The method of claim 7 wherein the received GPS coordinates are sent via said uplink messages.

9. The method of claim 1 wherein the fixed site transmitters of the recovery network sites are supplemented by vehicular-carried portable transmitters as by the recovery vehicle.

10. The method of claim 9 wherein the recovery vehicle is one or both of a direction-finding patrol car or an airborne vehicle such as a helicopter.

11. The method of claim 7 wherein emergency or accident sensing at the vehicle triggers such an uplink message.

12. The method of claim 1 wherein a deactivation signal is sent by the cellular network when appropriate.

13. Apparatus for utilizing the relatively wide-geographically spread cellular radio networks to supplement more limited stolen vehicle recovery radio network sites in activation of radio tracking and recovery of a vehicle, the apparatus having, in combination, a vehicle-equipped transponder for replying with a unique reply code transmission to a query from such a recovery network; a vehicle-equipped transceiver for replying with a unique identification transmission to a query from a cellular network; a control center, operable upon confirming vehicle theft, for instructing both the recovery network and the cellular network to send their respective queries to the respective transponder and transceiver of the vehicle; means for receiving from the vehicle transceiver said unique identification transmission at a site of the cellular network and sending from such site an identifying number thereof to the control center for providing over the wide geography of the cellular network, rough location guidance information to a recovery vehicle; and means for receiving from the vehicle transponder its reply code transmission to enable fine tracking of the vehicle by the recovery network and the recovery vehicle.

14. The apparatus of claim 13 wherein the recovery radio network and vehicle transponder operate on a dedicated frequency, and the cellular network and vehicle transceiver operate in the predetermined band of assigned cellular telephone frequencies.

15. The apparatus of claim 14 wherein said dedicated frequency is a VHF frequency and the cellular telephone frequencies are in the UHF band.

16. The apparatus of claim 15 wherein the recovery radio network is of the LOJACK type and the cellular radio network is of the GSM type.

17. The apparatus of claim 13 wherein means is provided for sending an early warning theft uplink message via either or both of the recovery radio network and the cellular network to the control center.

18. The apparatus of claim 17 wherein a vehicle movement sensor is provided to trigger such an uplink message.

19. The apparatus of claim 17 wherein the vehicle is further equipped with a GPS receiver, and the received latitude-longitude coordinates of the stolen vehicle are also sent to the control center.

20. The apparatus of claim 19 wherein the received GPS coordinates are sent via said uplink messages.

21. The apparatus of claim 13 wherein fixed-site transmitters of the recovery network sites are supplemented by vehicular-carried portable transmitters carried by the recovery vehicle.

22. The apparatus of claim 21 wherein the recovery vehicle is one or both of a direction-finding patrol car or an airborne vehicle such as a helicopter.

23. The apparatus of claim 19 wherein an emergency or accident sensor is provided at the vehicle to trigger such an uplink message.

24. The apparatus of claim 13 wherein means is provided for sending a deactivation signal by the cellular network when appropriate.

* * * * *